United States Patent [19]

Ulinski, Sr.

[11] Patent Number: 4,705,939
[45] Date of Patent: Nov. 10, 1987

[54] APPARATUS AND METHOD FOR OPTICALLY MEASURING BAR CODE DIMENSIONS

[75] Inventor: Richard J. Ulinski, Sr., Monrovia, Calif.

[73] Assignee: RJS Enterprises, Inc., Monrovia, Calif.

[21] Appl. No.: 655,535

[22] Filed: Sep. 28, 1984

[51] Int. Cl.[4] .............................................. G06K 7/10
[52] U.S. Cl. ................................... 235/466; 235/436; 235/462; 235/474; 356/385; 364/563
[58] Field of Search ............... 235/463, 466, 472, 462, 235/436, 474; 250/569; 356/385, 386; 364/563, 561

[56] References Cited

U.S. PATENT DOCUMENTS

| | | | |
|---|---|---|---|
| 3,898,689 | 8/1975 | D'Orazio et al. | 235/466 X |
| 4,232,216 | 11/1980 | Helle | 235/462 X |
| 4,370,724 | 1/1983 | Herbst et al. | 364/561 |

Primary Examiner—David L. Trafton
Attorney, Agent, or Firm—Thomas A. Turner, Jr.

[57] ABSTRACT

The absolute spatial distance of the widths of individual bars and spaces of a bar code are precisely measured by a bar code scanning apparatus having two photodetector circuit elements positioned a fixed and predetermined distance from each other for sensing light reflected from the bars and spaces of the bar code at a fixed differential time. The photodetectors are part of an integral unit and are parallel in independent circuits connected to a digital processing unit and storage memory for clocking the passage of the two photodetectors over the bars and spaces against an absolute time determined from a constant frequency pulse generator or digital clock. The precise measurement is compared with references and a readout is provided. A method for determining the precise width of each individual bar and space includes the determination of an average velocity determined from the velocity of the photodetectors over the leading edge of a bar or a space, and of the velocity over the trailing edge of the bar or space. From the average velocity and the time, an absolute spatial distance is determined.

12 Claims, 9 Drawing Figures

APPARATUS AND METHOD FOR OPTICALLY MEASURING BAR CODE DIMENSIONS

BACKGROUND OF THE INVENTION

1. Field of the Invention

The present invention relates to the art of bar code scanning, and more particularly to apparatuses for measuring absolute spatial distances of bars and spaces within bar codes, and to a method for determining a precise absolute distance of the widths of bars and spaces.

2. Description of the Prior Art

In the past, apparatuses for measuring relative widths or distances of bar codes have been provided having a light source and a photodetector for detecting light reflected from a light source off of a label or sheet having a bar code imprinted thereon. Such apparatuses require either portability so that the light source and detector, together with some related circuitry can be passed over a bar code imprint, or movement of the bar code imprint past the light source and detector circuit. Such movement is designed to be made by a human holding either the bar code detecting circuitry or holding the bar code imprint. Such scanning apparatuses are used primarily for verifying the accuracy of the bar code imprint, in order to determine whether the bar code when read by standard bar code readers as, for example, grocers and retail stores will produce the correct billing and identification information in the bar code readers.

In making such a check on the bar code, apparatuses in the past have had to make certain assumptions. For example, in digital processing of the information sensed by the photodetector, it is normally assumed that the velocity of the passing of the scanner over the bar code, or vice versa as the case may be, is a constant velocity from the beginning of the bar code to the end of the bar code. Such assumptions may not be valid for relatively wide bars or wide spaces in the bar code. Moreover, most bar codes have sufficient width so that the slightest distraction by the person holding the bar code scanner or the bar code imprint will cause a variation in the velocity, and hence inaccurate readings in the readout or output of the scanning circuitry.

Moreover, such measurements necessarily are not absolute, but measure the relative distances of the width of the bars and the spaces to each other or to some standard reference. In the past, it has been necessary to have relatively large tolerances in the width of the bars and the spaces in order to accommodate the foreseeable inaccuracies in measuring such widths or distances by handheld scanning devices and photodetectors. The necessity for incorporating such tolerances within reading devices has necessarily limited the precision and the quantity of information that can be stored in bar code imprints in given widths or distances.

It has been desired for some time to have a bar code measuring apparatus that will measure the absolute spatial distances or widths or bars and spaces in bar codes without relying on relative and proportional widths of the bars and the spaces to each other. It is also desired to have bar code measuring apparatuses that can make absolute spatial measurements of the widths or distances of bars and spaces, which are portable and operable by a human holding such apparatuses. It has been desired, further, to have a bar code measuring apparatus that is capable of establishing or having established its own fixed and predetermined spatial reference distance against which the widths or distances of bars and spaces in the bar code can be absolutely and precisely measured. It is desired yet further to have a method for precisely determining the absolute spatial distance or width of bars and spaces in a bar code which does not rely on additional equipment for providing known velocities in the passing of a bar code over a scanner, or of passing a bar code measuring apparatus or scanner over a bar code.

SUMMARY

In brief, in accordance with one aspect of the present invention, a bar code measuring apparatus is described comprising a central digital processing unit for processing digital signals, and including a digital clock or constant frequency pulse generator and digital memory means for determining precise spatial distance measurements on the basis of sensed light and dark areas, that is, spaces and bars in a bar code. An integral unit has a light source and two optical photodetectors positioned to receive light reflected off of a surface outside the integral unit. The photodetectors are spaced a fixed and a predetermined distance from each other, and connected by independent and parallel circuits to the central processing unit after providing a digital signal in response to a change in the reflectivity of the outside surface. The photodetectors will detect reflected light from a single point at different times, which are carefully measured against the pulse generator. The light reflected from the light source is magnified by a factor of five in a magnifying lens in order to amplify the spatial distance image created at the point where the photodetectors are mounted.

The central processing unit in accordance with the structure and program of the processing circuitry, determines the velocity of the measuring apparatus over the detected surface, such as the leading edge of the bar or space, by computing the dividend of the fixed distance between the photodetectors and the absolute time as measured against the pulse generator. A second velocity is similarly determined at the trailing edge of either the bar or the space in a bar code. An average of these velocities is used as the multiplier with the time of one or the other of the photodetectors passing over the bar or the space to provide as quotient the precise and absolute distance of the width of bar or the space.

A method for determining the absolute spatial distance of individuals bars and spaces in a bar code having a plurality of bars and spaces in sequential position is described having the steps of passing over the bar code from a beginning progressively to an end of the bar code, first and second photodetectors having between them a fixed and predetermined distance in the direction of scan, each photodetector receiving light reflected off the bar code from a common source or sources. Since the bar code has a distance between each other that is fixed and precisely measureable, the velocity of the photodetectors in the scanner can be determined if the time between the time that the first photodetector senses points on the bar code, and the time the second photodetector senses the same points on the bar code can be determined. Such times can be determined when the instance of the sensing by the photodetector of a certain point is measured against an absolute, e.g., digital clock, such as a constant frequency pulse generator and, the instance the second photodetector senses the same point at a later time can be measured against the same constant frequency pulse generator. The number of pulses between the two times can be counted. From these absolute references, the absolute distance between sensed points on the bar code is shown and described to be determinable.

Other novel features which are believed to be characteristic of the invention, both as to organization and method of operation, together with further objects and advantages thereof, will be better understood from the following description considered in connection with the accompanying drawings in which a preferred imbodiement of the invention is illustrated by way of example. It is to be understood, however, that the drawings are for the purpose of illustration and description only, and are not intended as a definition of limits of the invention.

DESCRIPTION OF THE PREFERRED EMBODIMENT

Figure 1:
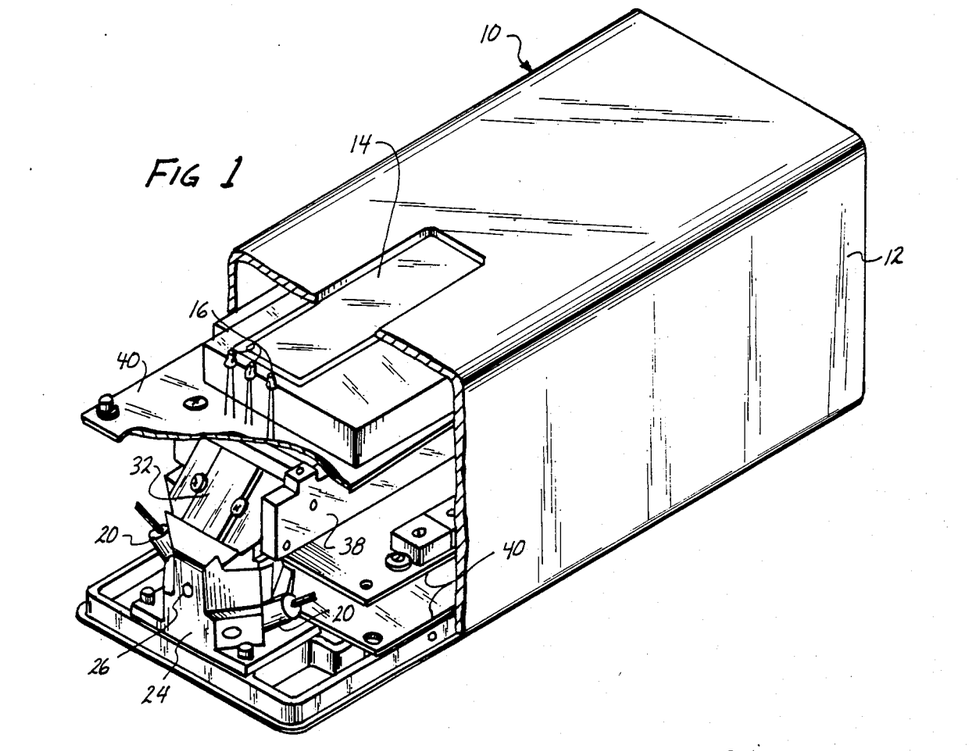
FIG. 1 is a perspective view of a measuring apparatus of the preferred embodiment of the present invention, having portions cut away for clarity and understanding.
Figure 2:
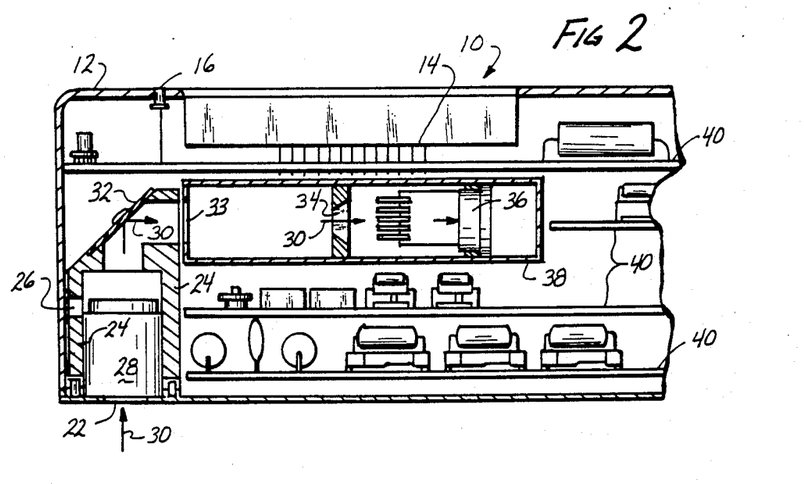
FIG. 2 is a side elevational view of the preferred embodiment of the invention cut away along the lines 2—2 of Figure one.

A measuring device 10 is shown, reference being had initially to FIGS. 1 and 2 of the drawings. The measuring device is enclosed within a cabinet 12 having a window 14 through which the alphanumeric display can be viewed. Indicator lights 16 protrude through the cabinet 12 so as to be seen from the outside.

The optical measuring device 10 comprises initially a light circuit beginning with a set of light sources 20 directing a relatively high intensity of lumens through an aperture 22, best seen in FIG. 2. The light is reflected off of or from a surface below the aperture 22 containing, for example, a bar code having a row of dark lines of varying widths separated by spaces of varying widths. In this specification, and in the appended claims the term distance will be used to indicate the dimension separating the leading edge and the trailing edge of bars and of spaces. The leading edge of a bar or a space will be that substantially vertical edge over which the light from the light sources 20 of the measuring device 10 pass first. The trailing edge of a bar or of a space will be that substantially vertical edge over which the light from the light source 20 of the measuring device 10 pass after the leading edge. Normally, the light sources are passed over a bar code comprising rows of vertically parallel dark or low reflectivity bars, and light or high reflectivity spaces, in a horizontal direction and usually from left to right. However, practice of the invention described herein will result in precise and accurate distance measurements of the widths of the bars and the spaces when passing the light sources 20 from right to left.

Light reflects off of the bar code imprint surface and returns through aperture 22 into lens 28 along light path 30. An access hole 36 through optical block 24 allows for the insertion of an adjusting tool for engaging the annular depression in lens 28 for adjusting the position of lens 28 vertically along the light path 30, should such measurement be necessary. The lens 28 is mounted within the optical block 24 mounted to the cabinet 12 and frame of the measuring device 10, but not so tightly that it cannot be adjusted vertically.

A mirror 32 positioned at a 45° angle to the light path 30 directs the light in a right angle turn from the lens 28 through aperture 33 and aperture 34 in the light box 38. Aperture 34 has a flair outwardly in the direction of light path 30 for reducing the flair of the light as it travels through the path 30.

The light box 38 is constructed preferably of light absorbing, black material, again for the purpose of reducing the flair of the light along the path 30. The light path 30 terminates on the holder 36 holding the photodetectors shown schematically in the block diagram of FIG. 3, and in more detail in the electrical schematic of FIG. 4. Various of the electrical circuitry are mounted on the circuit boards 40 within the cabinet 12, the circuit schematics being explained in greater detail below. In FIGS. 1 and 2, various components are shown generally mounted to the boards 40 solely for the purpose of indicating a preferred method of housing the physical elements of the circuit elements.

Figure 3:
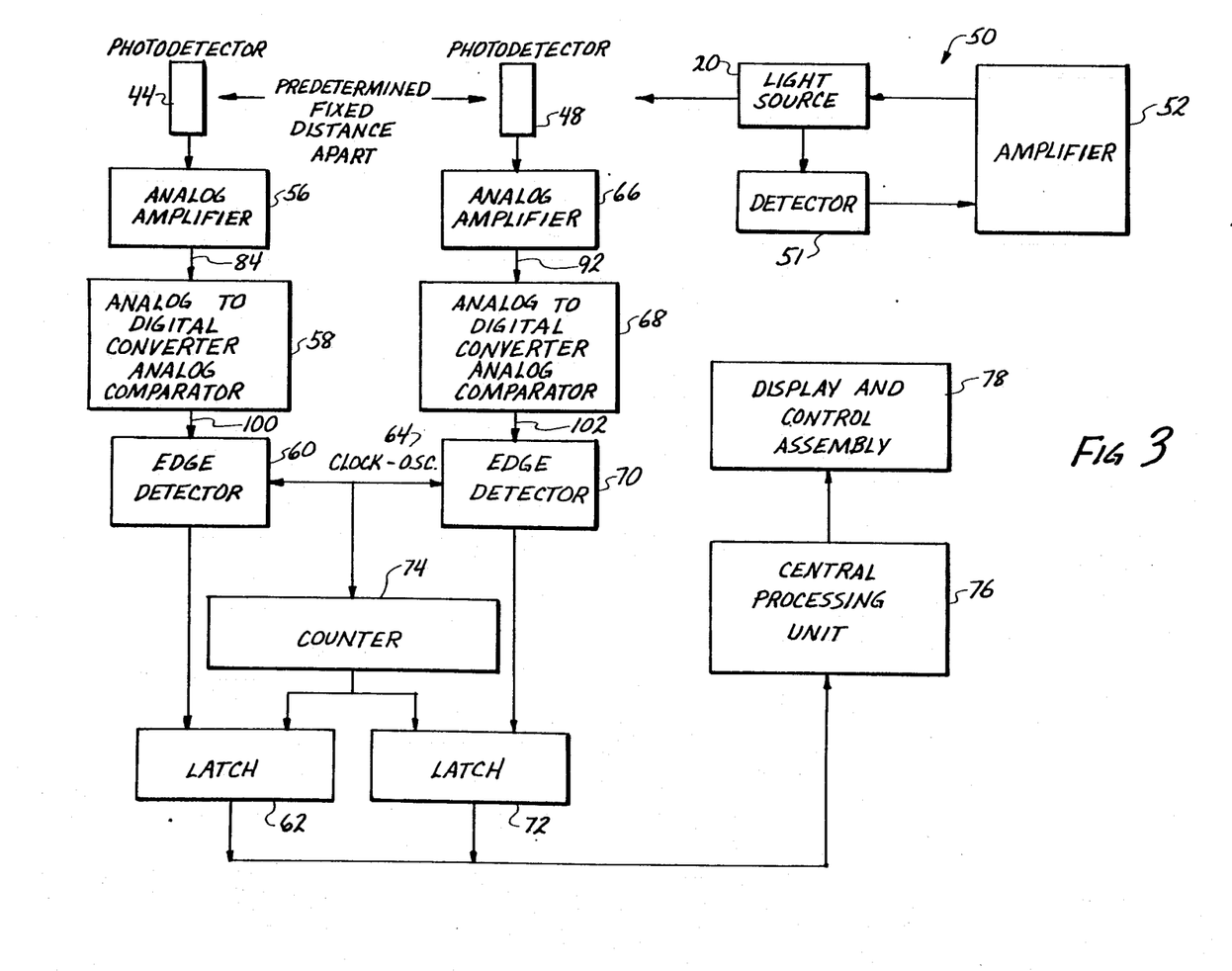
FIG. 3 is a block diagram schematic showing the elemental components of the circuitry of the preferred embodiment of the present invention.
Figures 4, 8:
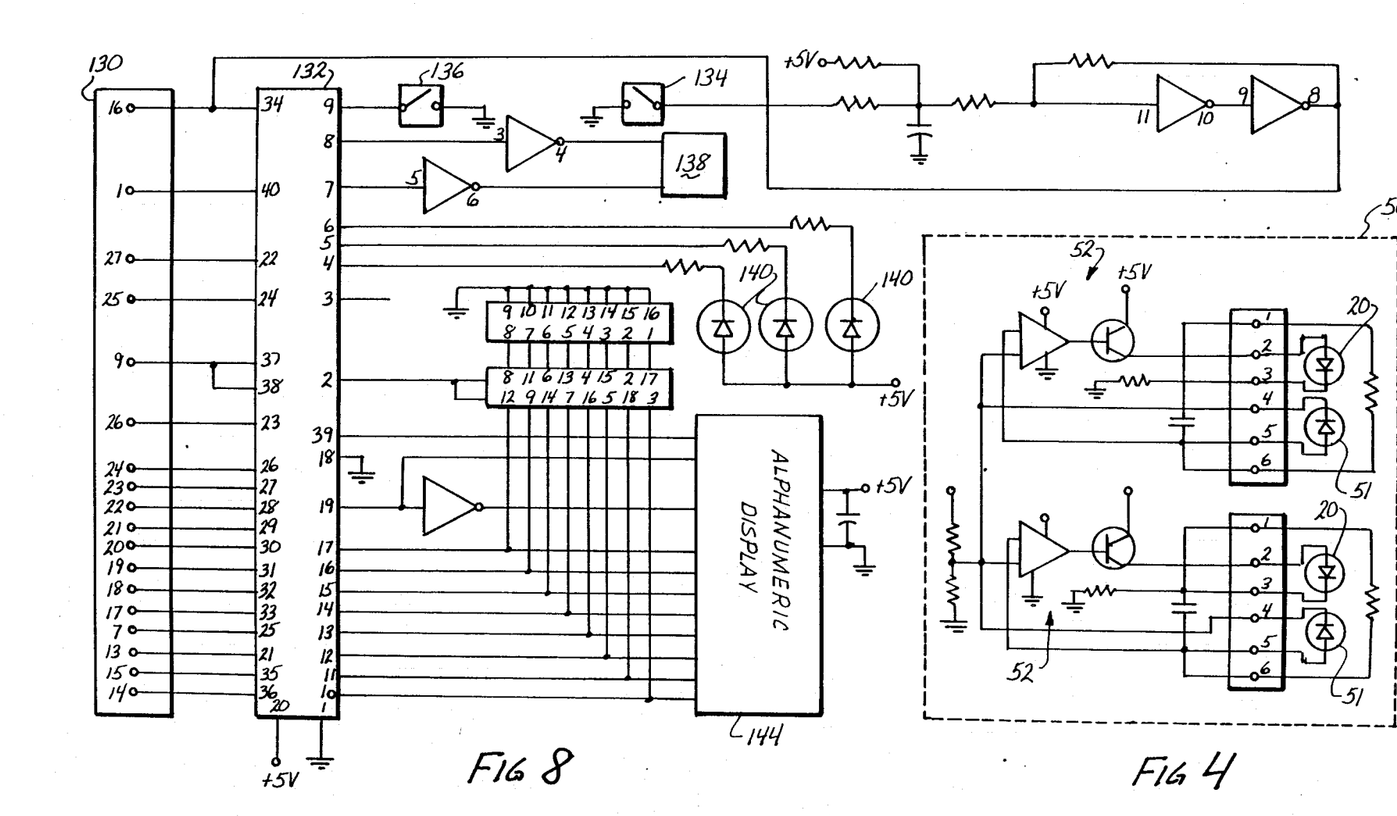
FIG. 4 is a detailed electrical schematic of one of the elemental components of the schematic of FIG. 3.
FIG. 8 is a detailed electrical schematic of yet another of the elemental components of FIG. 3.

Referring now to FIGS. 3 and 4 of the drawings, the light source assembly 50 is shown having the light source (FIGS. 1 and 2) directing light toward photodetectors 44, 48, and directing light to internal detector 51. Light is detected by internal detector 51 mounted in close proximity to the light source 20. The light source 20 is comprised of a light emitting diode (LED) and the detector is a photodetecting diode 51 mounted in a feedback loop to amplifier 52 for inversely regulating the current through the LED 20, so that as the light from LED 20 increases, the feedback loop including the detector 51 will decrease the current through the LED and hence decrease the intensity of the light from LED 20. In this manner, the light output of the LED is maintained at a stable and constant level. The electrical circuit of the light assembly 50 is shown in greater detail in FIG. 4 of the drawings.

Referring now in more detail to FIG. 3 of the drawings, the photodetectors 44, 48 are maintained in a predetermined and fixed distance from each other for purposes that will be explained in greater detail below. Each photodetector 44, 48 is the beginning of a separate photometric channel operating in parallel to each other. Light impending on photodetector 44, 48 is converted into an analog electrical signal amplified in analog amplifier 56, 66 and converted in analog-to-ditigal converter and analog comparator 58, 68. The edge detector 60, 70 comprises an electrical circuit for generating a pulse whenever the digital signal of converter 58, 68 goes from a high to a low, or from a low to a high across a threshold level signifying the sensing of an edge of a bar or a space in the bar code.

The pulse from the edge detector 60, 70 is seen respectively in the latch 62, 72 which latches the then present counter value from the counter 74. A constant frequency pulse generator generates a clock pulse 64 constantly updating the counter 74. Pulses from the generator 64 are also used to synchronize the latch 62, 72 with the counter 74 to prevent erroneous data from being loaded into the latch 62, 72. The central processing unit 76 is connected to the latches 62, 72 to selectively receive ditigal signal information therefrom and to determine the spatial distance measuring the width dimension of the bars and spaces, as will be explained in greater detail below. A display and control assembly 78 controls the display seen through window 14 (FIG. 1).

Figure 5:
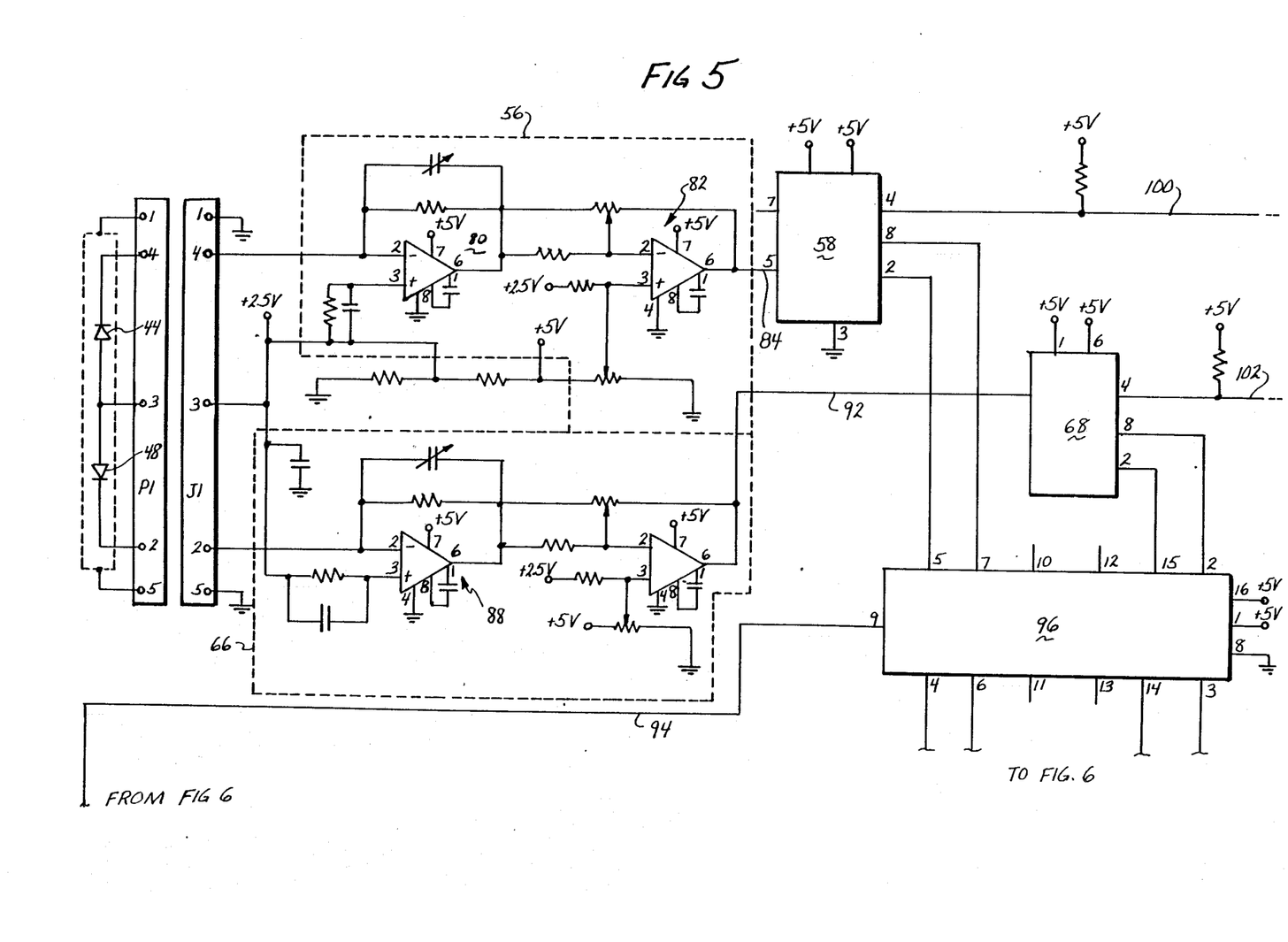
FIG. 5 is a detailed electrical schematic of one of the elemental components of FIG. 3.

Referring now to FIG. 5 of the drawings, the individual electrical components of a portion of the block schematic of FIG. 3 can be seen in greater detail. Thus, the photodetectors 44, 48 comprise light sensitive diodes which increase current with the increase in light detected. The diode 44 is connected to analog amplifier circuit 56 which converts the current signal to a voltage signal in operational amplifier 80, and amplifies the voltage signal in amplifier 82 producing an analog voltage signal at output 84 to analog-to-ditigal converter 58.

Similarly, photodetector diode 48 increases current with the increase of sensed or detected light, and the increased current is output to the analog amplifier 66, shown in broken lines in FIG. 5. The current signal is converted by operational amplifier 88 to an analog voltage signal, amplified by amplifier 90 and directed by output 92 to analog -to- ditigal converter 68.

Latch 96, which could be, for example, a TTL174, resets the counter of converter-comparator 58, 68 which could be, for example, a TL507. The latch 96 controls the operations of the converter-comparator 58, 68 to compare the analog voltage signal against a predetermined threshhold determined by the mean of the highest and the lowest analog voltage signal seen at the converter-comparator during the reflective measurement phase of the bar code scanning cycle. When the analog signal crosses the threshold value in the comparator 58, 68, the output along connector 100, 102 is changed, resulting in a change in the outputs 104, 106 of the edge detectors 60, 70 as seen better in the detailed electrical schematic of FIG. 6.

Figure 6:
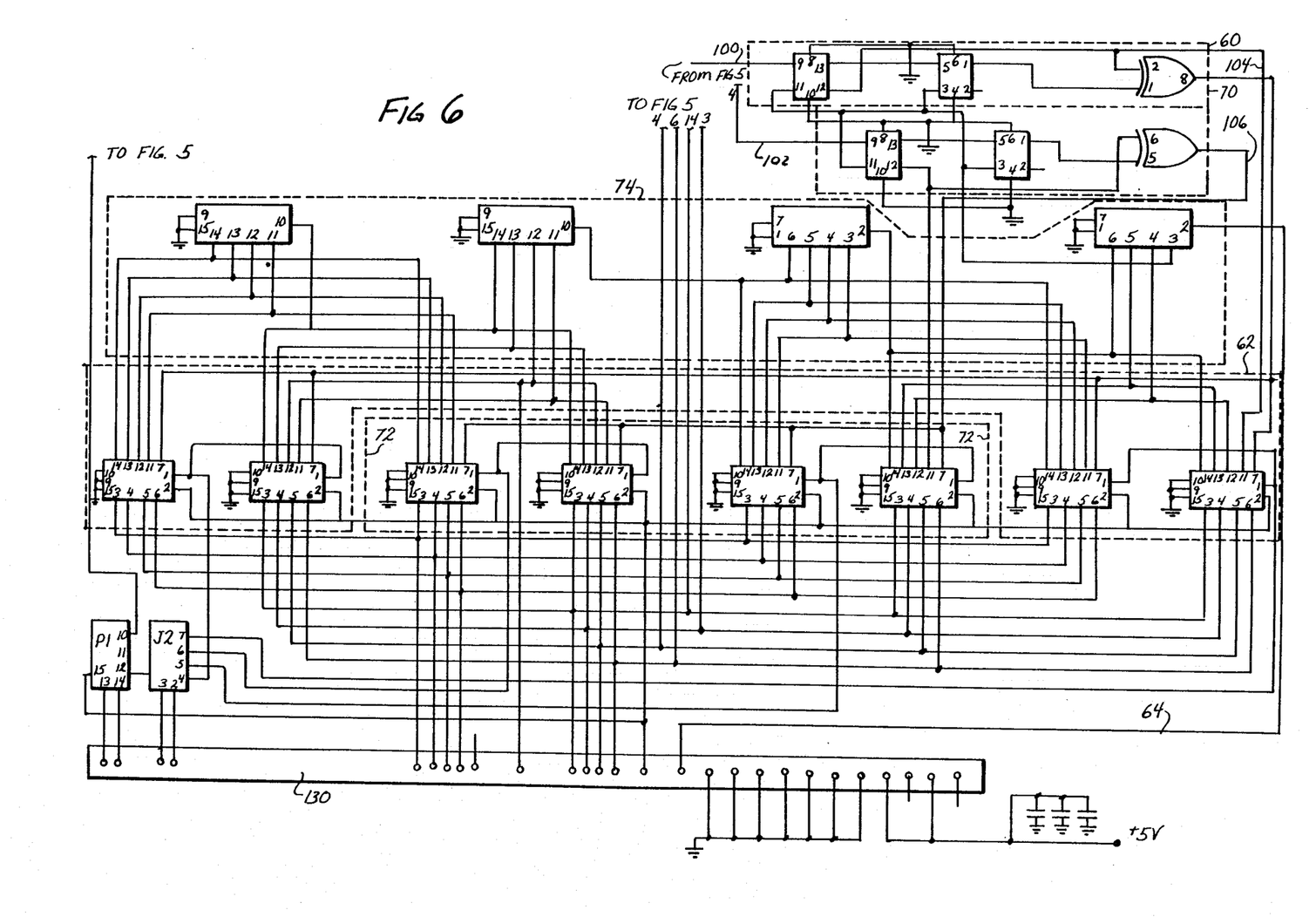
FIG. 6 is a detailed electrical schematic of one of the elemental components of FIG. 3.

In FIG. 6 of the drawings, the edge detector 60, 70 receives the output of converter-comparator 58, 68 and is stored in the low order position of the latch 62, 72. The counter 74 is also latched into latch 62, 72 when the transition or signal of leads 104, 106 occur. The clock pulse is seen in lead 65 and is generated by a constant frequency pulse generating circuit 64 seen in greater detail in FIG. 7 of the drawing. A frequency generator 110 produces a 6 megahertz pulse frequency, which is divided by 3 in divider 112 and divided by 2 in divider 114. Flip-flop 116 generates two non-overlapping square waves 180° out of phase, as required by the central processor 76, which in the preferred embodiment is a Motorola 6800. The clock frequency, therefore, is 1 MHz. in lead 64.

Figure 7:
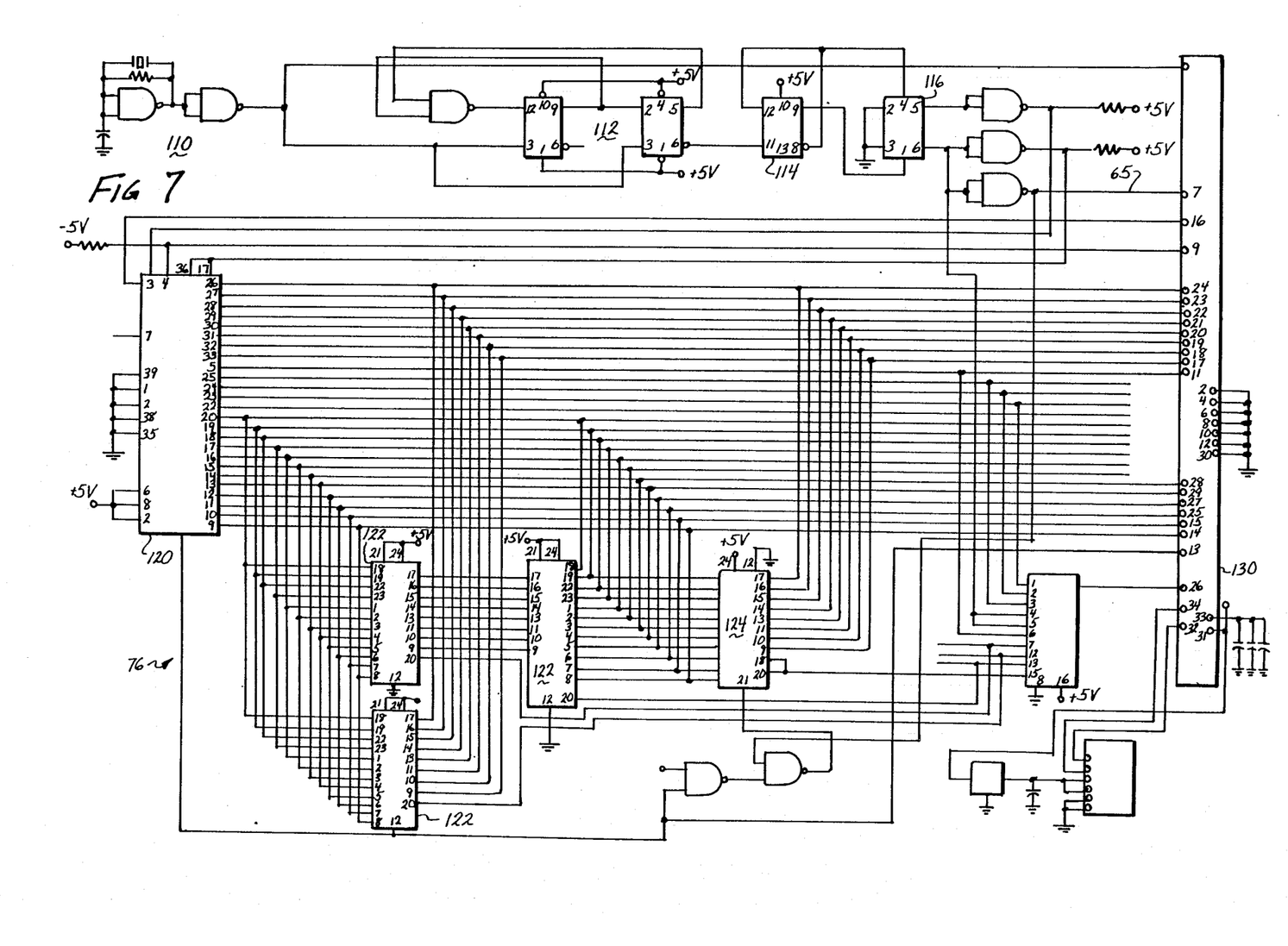
FIG. 7 is a detailed electrical schematic of one of the elemental components of FIG. 3.

The central processing unit 76 is seen in greater detail in FIG. 7 of the drawings and comprises a Motorola 6800 processor connected with three 4K by 8 bit, read only memories (ROMs) and one 2K by 8 bit random access memory (RAM). The ROM's are programmed in the preferred embodiment in accordance with the programs given in the assembly language in the Appendix, hereto and incorporated herein.

In FIG. 8 the peripheral, interconnect or interface adaptor 132 is connected to the common microprocessor bus 130, common to FIGS. 6, 7 and 8. A re-set switch 134 is provided to re-start the processor 76. A function switch 136 is also provided for serially stepping through the data generated by the analysis of the bar code scanned by the measuring device 10. An audible indicator 138 and light indicators, such as LED's 140 can be provided for giving certain signals in accordance with the program of the ROMs 122.

The alphanumeric display 144 is connected to the interconnect 132 to provide visual displays of the data determined by the analysis of the program in ROM's 122. The alphanumeric displays can be seen through window 14 as is provided through the cabinet 12 (FIG. 1).

Figure 9:
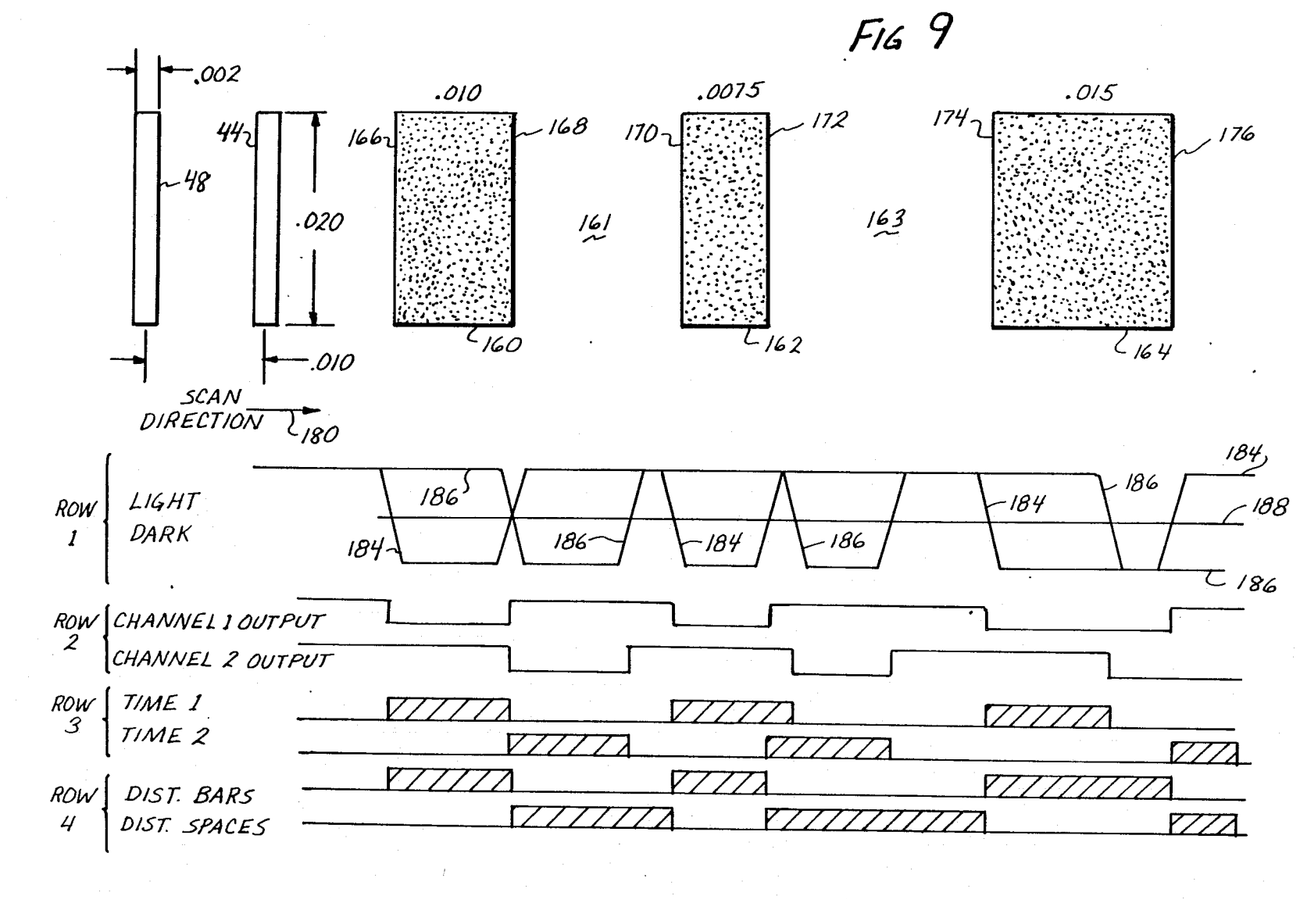
FIG. 9 is a bar diagram of certain aspects of the preferred method embodiment of the present invention.

In operation, reference being had to FIG. 9 of the drawings, a hypothetical bar code has bars 160, 162, 164 having varying widths or distances of, respectively, 0.010 inch, 0.0075 inch and 0.015 inch, not actual size in the drawing of FIG. 9 but drawn to a scale of 100:1. The bars, as well as the spaces 161, 163 therebetween are aligned vertically and parallel to each other. Each bar and each space has a leading edge and a trailing edge in the horizontal direction. Thus, bar 160 has a leading edge 166 and a trailing edge 168. Trailing edge 168 is the leading edge for the space 161. The trailing edge 170 for space 161 comprises the leading edge for bar 162. The trailing edge 172 for bar 162 comprises the leading edge for space 163. Trailing edge 174 for space 163 comprises the leading edge for bar 164. And there is a trailing edge 176 for bar 164, and so on. To the left of the bar code is shown photodetectors 44, 48 in fixed relation to each other and poised to scan the bar code in the direction of movement indicated by the direction entitled "Scan Direction" 180. The detectors 44, 48 receive light through the magnifying lens 28, so that the image at the detectors 44, 48 simulates a fixed and predetermined distance between the detectors 44, 48 of 0.010 inch. The image of each detector simulates a detector having a surface area of 0.02 inch by 0.002 inch, as indicated in the diagram of FIG. 9.

Aligned vertically in the drawing of FIG. 9 with the bars and spaces of the bar code are several output signal waveforms in Rows 1–4. As the photodetectors 44, 48 are moved so as to receive light reflected off the bar codes of FIG. 9, in the scan direction 180, the darkness or low reflectivity of bar 160 will initially cause the current in detector 44 to decrease significantly, as indicated by line or wave 184 in the waveform shown in Row 1 of the signal waveforms of FIG. 9. At precisely 0.010 inches thereafter, the reflected light sensed by photodetector 48, positioned 0.010 inches behind photodetector 44 in the direction of scan 180, also has a significant reduction in its sensed light, as indicated by wave 186 in Row 1. As the photodetector 44 passes over the trailing edge 168 of the first bar 160, the amount of reflected light sensed increases significantly, and so forth as is shown in Row 1. The wave forms 184, 186 of Row 1 are the signals as seen in outputs 84, 92, respectively, between the analog amplifiers 56, 66 and the converters-comparators 58, 68 in FIGS. 3 and 5 of the drawings.

Row 2 represents the wave form of the digital outputs 100, 102, respectively, the photometric channels 1 of photodetector 44, and 2 of photodetector 48. These output signals can be seen in FIGS. 3, 5 and 6 of the drawings.

Row 3 of FIG. 9 is a representation of the time that the respective photometric channels had light sensing below the threshold 188 shown in Row 1. The times of photometric channel 1 initiated by photodetector 44 are shown in the top Row entitled "Time 1," and the times of the photometric channel 2 initiated by photodetector 48 are shown in the lower Row entitled "Time 2." The times are determined by a difference in the leading edge and the trailing edge latched into latch 62, 72, respectively, as seen in FIG. 3 of the drawings.

In Row 4 of FIG. 9, the actual spatial distance of each bar and each space is charted, the distance being calculated from the formula:

$$D = V \times T$$

where D equals distance, V equals velocity and T equals the time. The time can be calculated absolutely in relation to the constant frequency pulse generator setting the clock pulses, as described above. The distance can be determined absolutely as the distance 0.010 inches between the image of the photodetectors 44, 48. The velocity can be determined therefrom.

As may be imaged, when moving the photodetectors over the bar code by a human hand, variations in the actual velocity may occur. A calculation designed to minimize variations in velocity, i.e., acceleration, would be to use as the velocity an average of the velocity of the two detectors over the leading edge of each bar and space, and the velocity of the two detectors over the trailing edge of each bar or space. A calculation for the distance using as the velocity this average velocity is given by the equation:

$$x = \frac{(T_4 - T_2) + (T_3 - T_1)\left(\frac{D}{T_2 - T_1} + \frac{D}{T_4 - T_3}\right)}{4}$$

Where
x equals the distance across a bar or space,
D equals the fixed and predetermined distance between the first photodetector 44 and the second photodetector 48,
$T_1$ equals the time that the first photodetector 44 crosses the leading edge of the bar or space,
$T_2$ equals the time that the second photodetector 44 crosses the leading edge of the bar or space.
$T_3$ equals the times that the first photodetector 44 crosses the trailing edge of the bar or space,
$T_4$ equals the time that the second photodetector 48 crosses the trailing edge of the bar or space.

As may be appreciated from the foregoing description of the preferred embodiment, a method for determining the spatial distance of individual bars and spaces in a bar code having a plurality of bars and spaces in sequential position is described. Further, a spatial distance measuring apparatus for measuring bar codes, having two photodetectors in fixed and predetermined distance relationship to each other is shown and described wherein the distance or width dimension of each bar and each space of a bar code can be precisely determined regardless of the velocity of the measuring apparatus over the bar code. Further, variations of the velocity inevitable in a human passing the apparatus over the code can be minimized by use of the described apparatus and method.

APPENDIX

```
Codascan Time -> Distance                              12-15-83

TTL FIXDAT
    DATA1  FDB  $200        * Codascan time-to-distance program
    DATA2  FDB  $300        *   using the Motorola 6800 processor
    NB     FCB  3           *
    T1     FDB  0           * Author: Hugh Clarke
    T2     FDB  0           *
    T3     FDB  0           * Date:   October 1983
    T4     FCB  0
    MUL0   FCB  0
    MUL1   FCB  0
    MUL2   FCB  0
    MUL3   FCB  0
    DIV0   FCB  0
    DIV1   FCB  0
    DIV2   FCB  0
    DIV3   FCB  0
    DIV4   FCB  0
    DIV5   FCB  0

ORG    $1000
    FIXDAT LDX  DATA1       * Pointer to leading detector time data
           STX  T1
           LDX  DATA2       * Pointer to trailing detector time data
           STX  T2
           LDX  #$100
           STX  T3          * Pointer to output buffer -> distance data
           LDX  #0
           STX  $100
           LDA  A,NB        * Calculate the number of program loops
           ASL  A           *   N bars times 2 minus 1
```

```
     DEC A
     STA A T4
FIX1 LDX T1              * T3 - T1 + T4 - T2
     LDA A 2,X
     LDA B 3,X
     SUB B 1,X
     SBC A 0,X
     LDX T2
     ADD B 3,X
     ADC A 2,X
     SUB B 1,X
     SBC A 0,X
     STA A MUL0           * Save multiplier
     STA B MUL1
     LDX #25              * 25 represents D/4 = .0025 inches
     STX MUL2
     JSR MUL              * (T3-T1+T4-T2) D/4
     LDX MUL0
     STX DIV0
     LDX MUL2
     STX DIV2
     LDX T2
     LDA A 0,X
     LDA B 1,X
     LDX T1
     SUB B 1,X            * T2 - T1
     SBC A 0,X
     STA A DIV4
     STA B DIV5
     JSR DIV              * (T3-T1+T4-T2) D/4 divided by T2-T1
     LDA A DIV2
     LDA B DIV3
     PSH A
     PSH B
     LDX MUL0
     STX DIV0
     LDX MUL2
     STX DIV2
     LDX T2
     LDA A 2,X
     LDA B 3,X
     INX
     INX
     STX T2
     LDX T1
     SUB B 3,X            * T4 - T3
     SBC A 2,X
     INX
     INX
     STX T1
     STA A DIV4
     STA B DIV5
     JSR DIV              * (T3-T1+T4-T2) D/4 divided by T4-T3
     PUL B
     PUL A
     ADD B DIV3           * Add the two long values above
     ADC A DIV2
     LDX T3
     ADD B 1,X
     ADC A 0,X
     STA A 2,X            * Store the result in the output buffer
     STA B 3,X
     INX
     INX
     STX T3
     DEC T4
     BEQ DONE             * Loop until all data is processed
     JMP FIX1
```

```
DONE SWI
 RTS
* INPUT   MUL0,MUL1
*         MUL2,MUL3
* OUTPUT  MUL0,MUL1
*         MUL2,MUL3
MUL CLR A                    * The 16 bit value in MUL0,MUL1 is multiplied
 CLR B                       *  the 16 bit value in MUL2,MUL3
 LDX #16                     * The 32 bit result is left in MUL0,MUL1,MUL2,MUL3
 ROR MUL2
 ROR MUL3
MNXT BCC MROT
 ADD B MUL1
 ADC A MUL0
MROT ROR A
 ROR B
 ROR MUL2
 ROR MUL3
 DEX
 BNE MNXT
 STA A MUL0
 STA B MUL1
 RTS

*INPUT  DIV0,DIV1,DIV2,DIV3   DIVIDEND
*       DIV4,DIV5             DIVISOR
*OUTPUT DIV2,DIV3
DIV LDA A DIV4                * The 32 bit value in DIV0,DIV1,DIV2,DIV3 is divided
 LDA B DIV5                   *  by the 16 bit value in DIV4,DIV5
 LSR A                        * The result is left in DIV2,DIV3
 ROR B
 ADD B DIV3
 ADC A DIV2
 STA B DIV3
 STA A DIV2
 LDA B #0
 LDA A #0
 ADC B DIV1
 ADC A DIV0
 LDX #17
DIVA CMP A DIV4
 BHI DIVC
 BCS DIVB
 CMP B DIV5
 BCC DIVC
DIVB CLC
 BRA DIVD
DIVC SUB B DIV5
 SBC A DIV4
 SEC
DIVD ROL DIV3
 ROL DIV2
 DEX
 BEQ DIVE
 ROL B
 ROL A
 BCC DIVA
 BRA DIVC
DIVE RTS

END
```

The foregoing detailed description of my invention in a preferred embodiment, both as to apparatus and as to method, is illustrative of specific embodiments only. It is to be understood, however, that additional embodiments may be perceived by those skilled in the art. The embodiments described herein together with those additional embodiments are considered to be within the scope of the present invention.

I claim:

1. In a bar code measuring apparatus for measuring absolute distance of bars and spaces having a photodetector receiving reflected light from a first point as the photodetector is passed over bars and spaces, for sensing bars and spaces and for producing first digital signals directly proportional to the absolute time of passing over each bar and each space, having digital signal storage memory means for storing in sequential order digital signals proportional to the absolute time of passing over each bar and space detected by the sensing, and having digital processing means for manipulating said stored signals to determine the time of passing over each bar and each space against some reference measurement, the improvement comprising:

a second photodetector means integral with and fixed a predetermined distance from said first photodetector means, having a photodetector receiving reflected light from a second point a predetermined distance from the first point at which said first photodetecting means receives reflected light, and connected to said digital signal storage memory means, for producing and directing into said digital signal storage memory means second digital signals directly proportional to the absolute time of passing over each bar and each space, said second photodetector means having further digital processing means for comparing said first digital signals with said second digital signals and for producing an absolute measurement of the distance of each bar and space.

2. The apparatus of claim 1 further comprising a constant frequency pulse generator; counting means connected to said constant frequency pulse generator and connected to said digital signal storage memory, for counting pulses generated thereby and for producing in said memory digital signals representative of the time of the said first and said second digital signals stored in said memory.

3. A method for determining the absolute spatial distance of bars, and of spaces therebetween in a bar code having a plurality of bars and spaces in sequential position having a beginning and an end, comprising:
(a) passing over said bar code from the beginning progressively to the end a first photodetector detecting light reflected from each bar and each space from a first point;
(b) passing over the bar code from the beginning progressively to the end a second photodetector detecting light reflected from each bar and each space, detecting at a point a predetermined and fixed spatial distance from a point from which said first photodetector detected reflected light;
(c) producing digital signals representative of the time of receiving the reflected light each photodetector receives from each bar and each space; and
(d) determining the absolute spatial distance of each bar and each space by comparing said digital signals produced from said first photodetector means and said second photodetector means against digital signals produced from a constant predetermined frequency pulse generator to determine a velocity of the movement of said bars and spaces relative to said photodetector means.

4. The method of claim 3 where, in said step of determining the absolute spatial distance, the velocity of the the first and second photodetectors in passing over each bar and each space is determined, and wherein each bar and each space comprises a leading edge and a trailing edge, and the distance between the leading and the trailing edges is determined from said velocity and the time of passing the photodetectors over each bar and each space.

5. The method of claim 4 wherein the velocity determined is the average velocity in passing over each bar and each space.

6. The method of claim 3 where each said bar and each said space comprises a leading edge detected first by said photodetectors and a trailing edge detected after said first detection, and in said step of producing digital signals a digital signal is produced by each photodetector as it passes over each leading edge and each successive trailing edge.

7. The method of claim 6 wherein said step producing digital signals the signals representative of the first photodetector and of the second photodetector passings over a leading edge are stored in a digital memory against clocked times and a velocity of the photodetectors passing over the leading edge is determined, and the signals representative of the first photodetector and the second photodetector passings over the successive trailing edge are stored against clocked times and a velocity of the photodetectors passing over the trailing edge is determined.

8. The method of claim 7 wherein the velocities of the photodetectors passings over a bar's or a space's leading edge and over its successive trailing edge are averaged, and the average velocity is used in said step of determining the absolute spatial distance of said bar or said space.

9. A spatial distance measuring apparatus comprising:
(a) a constant frequency pulse generator;
(b) digital signal processing means connected to receive pulse signals from said generator, for processing digital information including said pulses in accordance with a predetermined sequence of processing steps;
(c) digital memory storage means connected to said digital signal processing means for providing stored digital signals to said processing means when accessed in accordance with said predetermined sequence of processing steps;
(d) first photodetector means having a photodetector capable of sensing light reflected from a first point and connected to said digital memory storage means, for producing and storing in said memory storage means first digital signals representative of the amount of light sensed at said first point;
(e) second photodetector means having a photodetector capable of sensing light reflected from a second point which is a fixed and predetermined distance from said first point, said second photodetector means connected to said digital memory storage means, for producing and storing in said memory storage means second digital signals representative of the amount of light sensed at said second point; and,
(f) means within said digital processing means for comparing said first and said second digital signals and for determining a velocity at which the first and second photodetectors sensed light reflected from selected points having a contrast of reflectivity.

10. The spatial distance measuring apparatus of claim 9 adapted for measuring the spatial distance of a marking having a contrast in light reflectivity in relation to areas therearound, said marking at least partially bounded by a leading edge and a trailing edge, wherein each of said photodetector means includes means for producing corresponding digital signals representative of a change in light reflectivity at said leading edge and at said trailing edge.

11. The spatial distance measuring apparatus of claim 10 wherein said digital processing means includes means for determining a velocity at which said first and said second photodetector means sensed the leading edge, and for determining the velocity at which said first and said second photodetecting means sensed the trailing edge, and for determining the average of said velocities.

12. The spatial distance measuring apparatus of claim 11 wherein digital processing means includes means for determining the spatial distance between said leading and said trailing edges on the basis of the average of said velocity.

* * * * *